US007317965B2

(12) United States Patent
Koyama

(10) Patent No.: US 7,317,965 B2
(45) Date of Patent: Jan. 8, 2008

(54) AUTOMATIC SANDAL MANUFACTURING AND VENDING DEVICE

(75) Inventor: Kazuyuki Koyama, Kitakyusyu (JP)

(73) Assignee: K-Style Co., Ltd., Fukuoka (JP)

( * ) Notice: Subject to any disclaimer, the term of this patent is extended or adjusted under 35 U.S.C. 154(b) by 352 days.

(21) Appl. No.: 10/530,587

(22) PCT Filed: Sep. 29, 2003

(86) PCT No.: PCT/JP03/12483

§ 371 (c)(1),
(2), (4) Date: May 10, 2005

(87) PCT Pub. No.: WO2004/034341

PCT Pub. Date: Apr. 22, 2004

(65) Prior Publication Data

US 2006/0150399 A1 Jul. 13, 2006

(30) Foreign Application Priority Data

Oct. 11, 2002 (JP) ............................ 2002-299538

(51) Int. Cl.
*G06F 17/00* (2006.01)

(52) U.S. Cl. .......................... 700/233; 36/11.5; 36/45; 36/83; 36/12; 700/231; 700/232

(58) Field of Classification Search ........ 700/231–244; 221/1–312 C; 36/12–58; 12/7–16
See application file for complete search history.

(56) References Cited

U.S. PATENT DOCUMENTS

2005/0067420 A1* 3/2005 Diaz et al. .................... 221/2

FOREIGN PATENT DOCUMENTS

| | | |
|---|---|---|
| JP | 2002-63428 | 2/2002 |
| JP | 2978102 | 5/2002 |
| KR | 2001058027 A * | 7/2001 |

* cited by examiner

*Primary Examiner*—Gene O. Crawford
*Assistant Examiner*—Michael K Collins
(74) *Attorney, Agent, or Firm*—Jordan and Hamburg LLP

(57) ABSTRACT

An automatic manufacturing-vending machine for sandals according to the present invention comprises a sole housing portion housing a plurality of soles for sandals according to a plurality of sizes, an upper housing portion housing a plurality of uppers for sandals according to a plurality of sizes, a size selecting portion for a user to select a desirable size of soles and uppers, a size selecting portion for a user to select a desirable size of soles and uppers, a compensation paying portion for a user to pay compensation for manufacturing and vending desirable sandals, an attaching mechanism portion for attaching uppers desired by a user to soles desired by the user, and a sandal ejecting portion for ejecting sandals formed by attaching the uppers to the soles by the attaching mechanism portion into a takeout opening from which a user can take out the same, and these are housed in a housing.

9 Claims, 10 Drawing Sheets

AUTOMATIC SANDAL MANUFACTURING AND VENDING DEVICE

TECHNICAL FIELD

The present invention relates to an automatic manufacturing-vending machine for sandals which is installed near a bathing beach or pool and enables sea bathers and the like to easily obtain sandals of their choice on the spot.

BACKGROUND ART

Priorly, box-type automatic rental shoe vending machines have been installed in bowling alleys. These automatic rental shoe vending machines are constructed, for example, so that a plurality of size-to-size shoe storing sections are provided in a box-type housing similar to an automatic beverage vending machine, respective size-by-size shoes are stored in plurality in the respective shoe storing sections, and when a user inserts coins into a coin slot after specifying a shoe size on a touch panel, which also serves as a display panel, a shoe storing drum corresponding to a shoe storing section in which shoes of the specified size have been stored is selected, the shoe storing drum is rotated by a drive means, and shoes of the desired size are picked up out of the shoe storing section and are slid down into a shoe takeout opening (See Japanese Patent No. 2978102, for example.).

In addition, priorly, known is a service which allows a user to access a footwear distributor's site placed on the Internet, wherein when the user specifies a type of footwear such as shoes (women's shoes, men's shoes, children's shoes and the like), a size, and a form such as a basic type, a color, a heel, an upper, and accessories while looking at a screen and places an order as if it is a custom-made product, the distributor receives the order and manufactures the shoes, and delivers the same by a home delivery service or the like (See Japanese Published Unexamined Patent Application No. 2002-63428, for example.).

However, the aforementioned automatic shoe rental machines are only for rental shoes in bowling alleys and the like and not for manufacturing and selling desired shoes for users who desire shoes immediately on the spot. In addition, the aforementioned service for receiving orders for shoes at a shoe distributor's site on the Internet is merely provided to place a conventional order for custom-made-like footwear by way of the Internet and is not for manufacturing and selling desired footwear to users who desire footwear immediately on the spot.

DISCLOSURE OF THE INVENTION

The present invention has been made in view of such problems in prior arts, and an object thereof is to provide an automatic manufacturing-vending machine for sandals which is capable of manufacturing and selling, to a user who needs sandals on a site such as a bathing beach or pool, sandals of a size, type, or color desired by the user immediately on the spot.

In order to solve such problems in prior arts, an automatic manufacturing-vending machine for sandals according to the present invention comprises: a sole housing portion housing a plurality of soles for sandals according to a plurality of sizes; a sole pickup portion for picking up soles of a predetermined size out of the plurality of soles housed in the sole housing portion; an upper housing portion housing a plurality of uppers for sandals according to a plurality of sizes; an upper pickup portion for picking up uppers of a predetermined size out of the plurality of uppers housed in the upper housing portion; a size selecting portion for a user to select a desirable size of soles and uppers; a compensation paying portion for a user to pay compensation for manufacturing and vending desirable sandals; a control means for controlling the sole pickup portion and the upper pickup portion so as to pick up soles and uppers of a size selected by a user out of the sole housing portion and the upper housing portion, respectively, based on a signal from the size selecting portion or the compensation inputting portion; an attaching mechanism portion for attaching the picked-up uppers to the picked-up soles based on a signal from the control means of the compensation paying portion; and a sandal ejecting portion for ejecting sandals formed by attaching the uppers to the soles by the attaching mechanism portion into a sandal takeout opening from which a user can take out the same, wherein the sole housing portion, the upper housing portion, the sole pickup portion, the upper pickup portion, the attaching mechanism portion, and the sandal ejecting portion are housed in one housing.

In addition, an automatic manufacturing-vending machine for sandals according to the present invention comprises: a sole housing portion housing a plurality of soles for sandals according to a plurality of sizes; a sole pickup portion for picking up soles of a predetermined size out of the plurality of soles housed in the sole housing portion; an upper housing portion housing a plurality of uppers for sandals according to a plurality of sizes and a plurality of types; an upper pickup portion for picking up uppers of a predetermined size and type out of the plurality of uppers housed in the upper housing portion; a size and type selecting portion for a user to select a desirable size and type of soles and uppers; a compensation paying portion for a user to pay compensation for manufacturing and vending desirable sandals; a control means for controlling the sole pickup portion and the upper pickup portion so as to pick up soles of a size selected by a user out of the sole housing portion and pick up uppers of a size and type selected by a user from the upper housing portion based on a signal from the size and type selecting portion or the compensation inputting portion; an attaching mechanism portion for attaching the picked-up uppers to the picked-up soles based on a signal from the control means of the compensation paying portion; and a sandal ejecting portion for ejecting sandals formed by attaching the uppers to the soles by the attaching mechanism portion into a sandal takeout opening from which a user can take out the same, wherein the sole housing portion, the upper housing portion, the sole pickup portion, the upper pickup portion, the attaching mechanism portion, and the sandal ejecting portion are housed in one housing.

In addition, an automatic manufacturing-vending machine for sandals according to the present invention comprises: a sole housing portion housing a plurality of soles for sandals according to a plurality of sizes and a plurality of colors; a sole pickup portion for picking up soles of a predetermined size and color out of the plurality of soles housed in the sole housing portion; an upper housing portion housing a plurality of uppers for sandals according to a plurality of sizes and a plurality of colors; an upper pickup portion for picking up upper portions of a predetermined size and color out of the plurality of uppers housed in the upper housing portion; a size and color selecting portion for a user to select a desirable size and color of soles and uppers; a compensation paying portion for a user to pay compensation for manufacturing and vending desirable sandals; a control means for controlling the sole pickup portion and the upper pickup portion so as to pick up soles and uppers of a size and color selected by a user out of the sole housing portion and the upper housing portion, respectively, based on a signal from the size and color selecting portion or the compensation inputting portion; an attaching mechanism portion for attaching the picked-up uppers to the picked-up soles based on a signal from the control means of the compensation paying portion; and a sandal ejecting portion for ejecting sandals formed by attaching the uppers to the soles by the attaching mechanism portion into a sandal takeout opening from which a user can take out the same, wherein the sole housing portion, the upper housing portion, the sole pickup portion, the upper pickup portion, the attaching mechanism portion, and the sandal ejecting portion are housed in one housing.

In addition, an automatic manufacturing-vending machine for sandals according to the present invention comprises: a beltlike-body housing portion housing beltlike bodies for forming soles for sandals of a plurality of sizes; an upper housing portion housing a plurality of uppers for sandals according to a plurality of sizes; an upper pickup portion for picking up uppers of a predetermined size out of the plurality of uppers housed in the upper housing portion; a sole size selecting portion for a user to select a desirable size of soles; an upper size selecting portion for a user to select a desirable size of uppers; a compensation paying portion for a user to pay compensation for manufacturing and vending desirable sandals; a cutout portion for cutting out a beltlike body from the beltlike-body housing portion into forms of the size of soles selected by a user based on a signal from the size and type selecting portion or the compensation inputting portion; a control means for controlling the upper pickup portion so as to pick up uppers of a size selected by a user out of the upper housing portion based on a signal from the upper size selecting portion or the compensation inputting portion; an attaching mechanism portion for attaching uppers picked up out of the upper housing portion to soles cut out by the cutout portion based on a signal from the cutout portion, the control portion, or the compensation paying portion; and a sandal ejecting portion for ejecting sandals formed by attaching the uppers to the soles by the attaching mechanism portion into a sandal takeout opening from which a user can take out the same, wherein the beltlike-body housing portion, the upper housing portion, the upper pickup portion, the cutout portion, the attaching mechanism portion, and the sandal ejecting portion are housed in one housing.

In addition, an automatic manufacturing-vending machine for sandals according to the present invention comprises: a beltlike-body housing portion housing beltlike bodies for forming soles for sandals of a plurality of sizes and types; an upper housing portion housing a plurality of uppers for sandals according to a plurality of sizes and a plurality of types; an upper pickup portion for picking up uppers of a predetermined size and type out of the plurality of uppers housed in the upper housing portion; a size and type selecting portion for a user to select a desirable size of soles and a desirable size and type of uppers; a compensation paying portion for a user to pay compensation for manufacturing and vending desirable sandals; a cutout portion for cutting out a beltlike body from the beltlike-body housing portion into forms of the size of soles selected by a user; a control means for controlling the upper pickup portion so as to pick up uppers of a size and type selected by a user out of the upper housing portion based on a signal from the size and type selecting portion or the compensation inputting portion; an attaching mechanism portion for attaching uppers picked up out of the upper housing portion to soles cut out by the cutout portion based on a signal from the cutout portion, the control portion, or the compensation paying portion; and a sandal ejecting portion for ejecting sandals formed by attaching the uppers to the soles by the attaching mechanism portion into a sandal takeout opening from which a user can take out the same, wherein the beltlike-body housing portion, the upper housing portion, the upper pickup portion, the cutout portion, the attaching mechanism portion, and the sandal ejecting portion are housed in one housing.

In addition, in the automatic manufacturing-vending machine for sandals according to the present invention, it is preferable to provide: a sole color selecting portion for a user to select a desirable sole color; an upper color selecting portion for a user to select a desirable upper color; a sole coloring portion for coloring, based on a signal from the sole color selecting portion, soles selectively picked out of the sole housing portion with a color selected by a user (for example, spraying or applying a paint of that color); and an upper coloring portion for coloring, based on a signal from the upper color selecting portion, uppers selectively picked out of the upper housing portion with a color selected by a user (for example, spraying or applying a paint of that color).

In addition, in the present invention, it is preferable to further provide: a sole image forming portion for a user to select or externally import a desirable print image of soles; and a sole printing portion for printing an image selected by a user on soles selectively picked out of the sole housing portion based on a signal from the sole image forming portion.

In addition, in the automatic manufacturing-vending machine for sandals according to the present invention, it is preferable to provide: a sole color selecting portion for a user to select a desirable sole color; an upper color selecting portion for a user to select a desirable upper color; a sole coloring portion for coloring, based on a signal from the sole color selecting portion, soles selectively picked out of the sole housing portion or soles obtained by being cut out from the beltlike-body by the cutout portion with a color selected by a user (for example, spraying or applying a paint of that color); and an upper coloring portion for coloring, based on a signal from the upper color selecting portion, uppers selectively picked out of the upper housing portion with a color selected by a user (for example, spraying or applying a paint of that color).

In addition, in the automatic manufacturing-vending machine for sandals according to the present invention, it is preferable to provide: a packing portion for enclosing, before sandals formed by attaching the uppers to the soles by the attaching mechanism portion are ejected, sandals in a container such as a bag or a box.

Furthermore, in the automatic manufacturing-vending machine for sandals according to the present invention, it is preferable that, in the housing, a display portion for displaying images to serve a user in selecting a sole color, an upper color, or an upper type is provided.

BEST MODE FOR CARRYING OUT THE INVENTION

Embodiment 1

Figure 1:
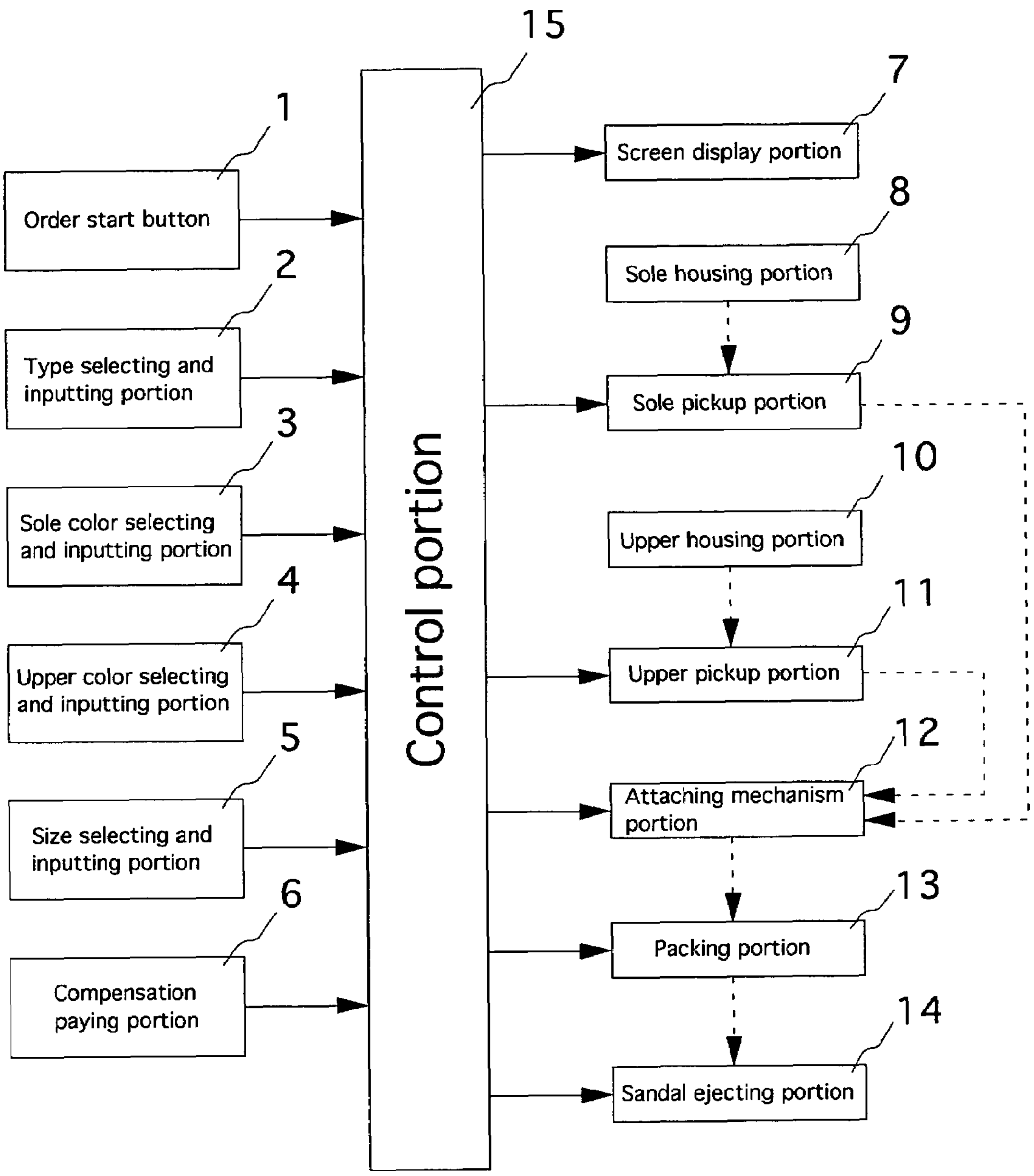
FIG. 1 is a schematic block diagram showing a construction of an automatic manufacturing-vending machine for sandals according to Embodiment 1 of the present invention.

FIG. 1 shows a schematic block diagram showing an electrical construction of an automatic manufacturing-vending machine for sandals according to Embodiment 1. In FIG. 1, 1 denotes an order start button attached to the surface of a housing, which is an order start button for a user to press first when he/she orders sandals of his/her choice by use of Embodiment 1, 2 denotes a type selecting and inputting portion for a user to select and input a type (upper type) of desirable sandals, 3 is a sole color selecting and inputting portion for a user to select and input a sole color of desirable sandals, 4 denotes an upper color selecting and inputting portion for a user to select and input an upper color of desirable sandals, 5 denotes a size selecting and inputting portion for a user to select and input a size of desirable sandals, and 6 denotes a compensation paying portion for a user to pay a purchase price for desirable sandals.

In addition, in FIG. 1, 7 denotes a screen display portion for making a user select a sole or upper type, color, size and the like of sandals, 8 denotes a sole housing portion for housing a plurality of soles according to a plurality of colors and sizes, respectively (for example, a sole housing portion which has been divided into a plurality of storing sections so that a plurality of soles sorted according to colors and sizes can be separately stored in the respective storing sections), 9 denotes a sole pickup portion for picking up, out of the sole housing portion 8, soles of a color and size selected by a user (composed of, for example, a pickup mechanism for shifting to any of the aforementioned storing sections and picking up a pair of the soles stored therein), 10 denotes an upper housing portion for housing a plurality of uppers according to a plurality of colors, types, and sizes, respectively (for example, an upper housing portion which has been divided into a plurality of storing sections so that a plurality of uppers sorted according to colors, types, and sizes can be stored in the respective storing sections), and 11 denotes an upper pickup portion for picking up, out of the upper housing portion 10, uppers of a color, type, and size selected by a user (composed of, for example, a pickup mechanism for shifting to any of the aforementioned storing sections and picking up one of the uppers stored therein.)

In addition, in FIG. 1, 12 denotes an attaching mechanism for bonding and joining a sole picked up by the sole pickup portion 9 and an upper picked up by the upper pickup portion 11 to each other (for example, pushing in leg portions (lower-end projecting portions) into a plurality of holes formed in advance in the sole so as to be fixed), 13 denotes a packing portion for enclosing, after soles and uppers are bonded by the attaching mechanism portion 12 and sandals are manufactured, the sandals in a container such as a plastic bag, and 14 denotes a sandal ejecting portion for shifting sandals enclosed in a container such as a plastic bag to a sandal ejecting portion into which a user can insert his/her hand to take out the same.

In addition, in FIG. 1, 15 denotes a control portion composed of a microcomputer or the like for making the screen display portion 7 display a predetermined image and characters, upon receiving an input from the order start button, type selecting and inputting portion 2, sole color selecting and inputting portion 3, upper color selecting and inputting portion 4, size selecting and inputting portion 5, and compensation paying portion 6, and also for controlling the sole pickup portion 9, upper pickup portion 11, attaching mechanism portion 12, and sandal ejecting portion 14. In addition, broken lines show flows of soles, uppers, and sandals in FIG. 1.

Figure 2:
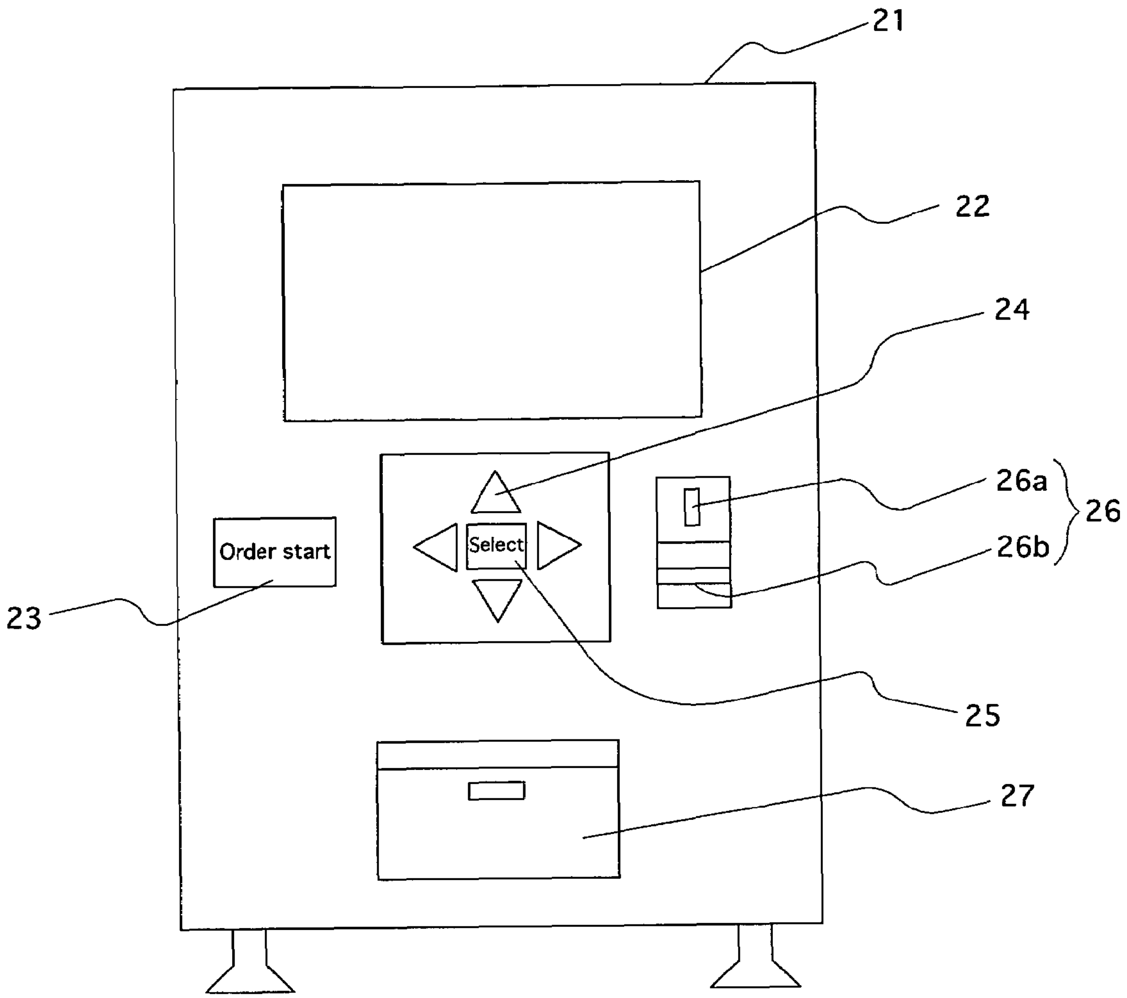
FIG. 2 is an external appearance view of Embodiment 1.

Next, FIG. 2 is a front view showing an external appearance construction of an automatic manufacturing-vending machine for sandals according to Embodiment 1. In Embodiment 1, respective blocks 1 to 15 of FIG. 1 are all incorporated in a housing 21 shown in FIG. 2 or are housed so that a part thereof is exposed on the external surface of the housing 21.

In FIG. 2, 21 denotes a housing, 22 denotes a liquid crystal display provided on an upper front of the housing 21, 23 denotes an order start button provided on the left of a center front of the housing 21, 24 denotes four cursor keys radially arranged on the center front of the housing 21, 25 denotes a select key provided on the center front (a central position of the four radially arranged cursor keys) of the housing 21, 26 denotes a compensation paying portion composed of a coin slot 26*a* and a bill slot 26*b*, and 27 denotes a sandal ejecting port (constructed so that a user can take out sandals by opening a cover) into which sandals manufactured in accordance with an order from a user are discharged.

Figure 3:
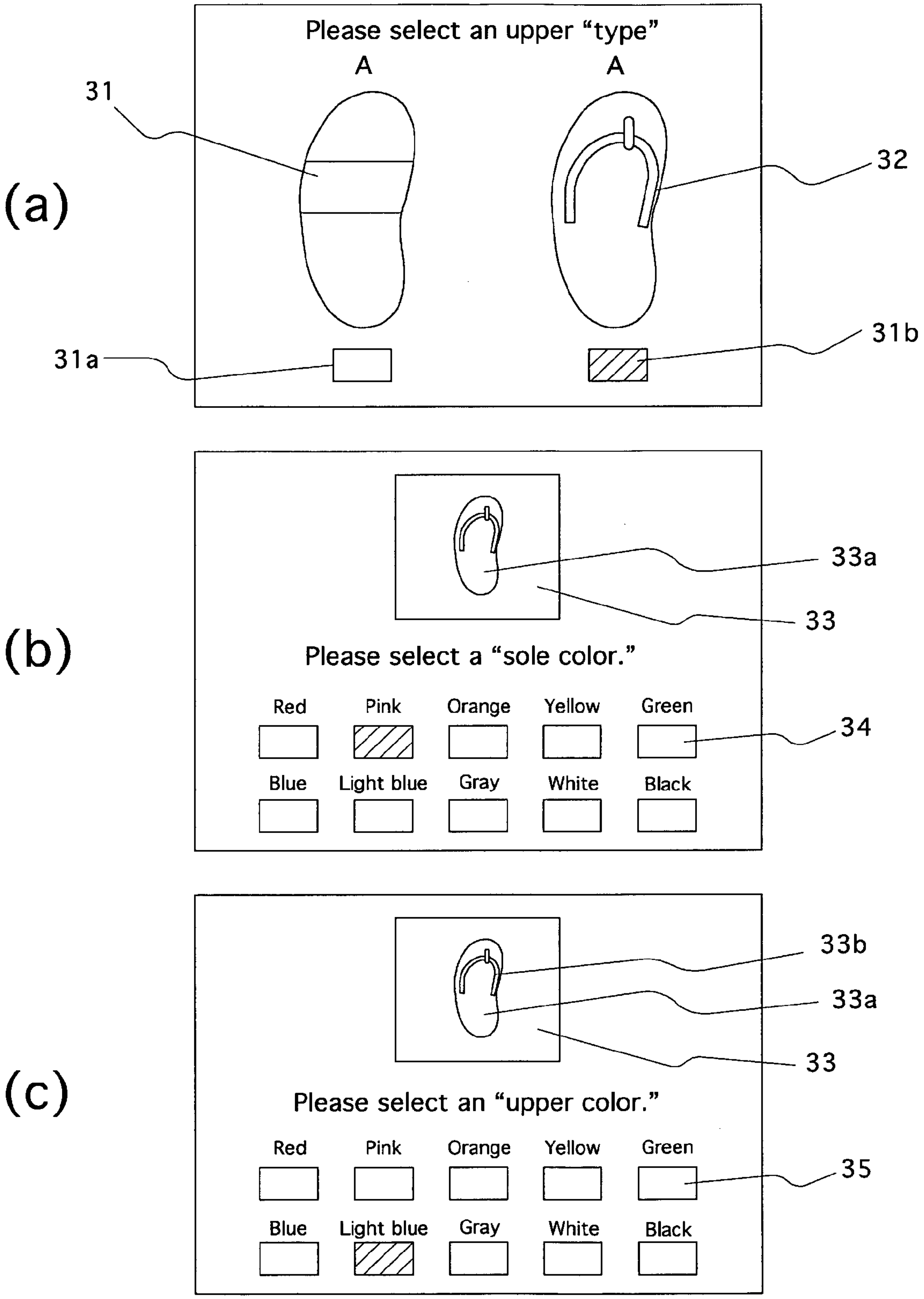
FIG. 3 are explanatory views for explaining operations of Embodiment 1.

Next, operations of Embodiment 1 will be described with reference to FIG. 3 and FIG. 4. First, when a user presses the order start button of FIG. 2, the control portion 15 makes the liquid display 22 (see FIG. 2) display a "screen prompting the user to select and input an upper type of sandals" as shown in FIG. 3(*a*). In the example of FIG. 3(*a*), two types of upper images of a horizontal belt-type upper 31 illustrated on the left side and a upper 32 of a type illustrated on the right side are displayed to prompt a user to select either type. The user operates the cursor keys 24 and select key 25 (see FIG. 2) to select either select button 31*a* or 32*b* on the screen corresponding to either upper. Herein, description will be continued for the following on the assumption that the user has selected the button 32*b* corresponding to the thong-type upper 32.

When the user has selected and inputted the thong-type upper 32 in compliance with the screen of FIG. 3(*a*), the control portion 15 makes the liquid crystal display 22 display a "screen prompting the user to select and input a sole color" as shown in FIG. 3(*b*). In the example of FIG. 3(*b*), as illustrated, a sandal image 33 consisting of a sole and an upper and a total of ten select buttons 34 corresponding to a total of ten colors, respectively, are displayed on the screen. When the user operates the cursor keys 24 to reverse any color of the total of ten buttons 34, a sole image 33*a* in the image 33 is colored with the color corresponding to the reversed button 34. Accordingly, the user can select a desirable color for soles while looking at the colored sole image 33*a*. Herein, description will be continued for the following on the assumption that the user has selected, for example, pink for the sole color.

When the user has selected and inputted, for example, pink as a sole color in compliance with the screen of FIG. 3(*b*), the control portion 15 makes the liquid crystal display 22 display a "screen prompting the user to select and input an upper (in this case, a thong-type upper) color" as shown in FIG. 3(*c*). In the example of FIG. 3(*c*), as illustrated, a sandal image 33 consisting of a sole and an upper and a total of ten select buttons 35 corresponding to a total of ten colors, respectively, are displayed on the screen. When the user operates the cursor keys 24 to reverse any color of the total of ten buttons 35, an upper image 33*b* in the image 33 is colored with the color corresponding to the reversed button 35. Accordingly, the user can select a desirable color for an upper while looking at the colored upper image. Herein, description will be continued for the following on the assumption that the user has selected, for example, pink for the upper color.

Figure 4:
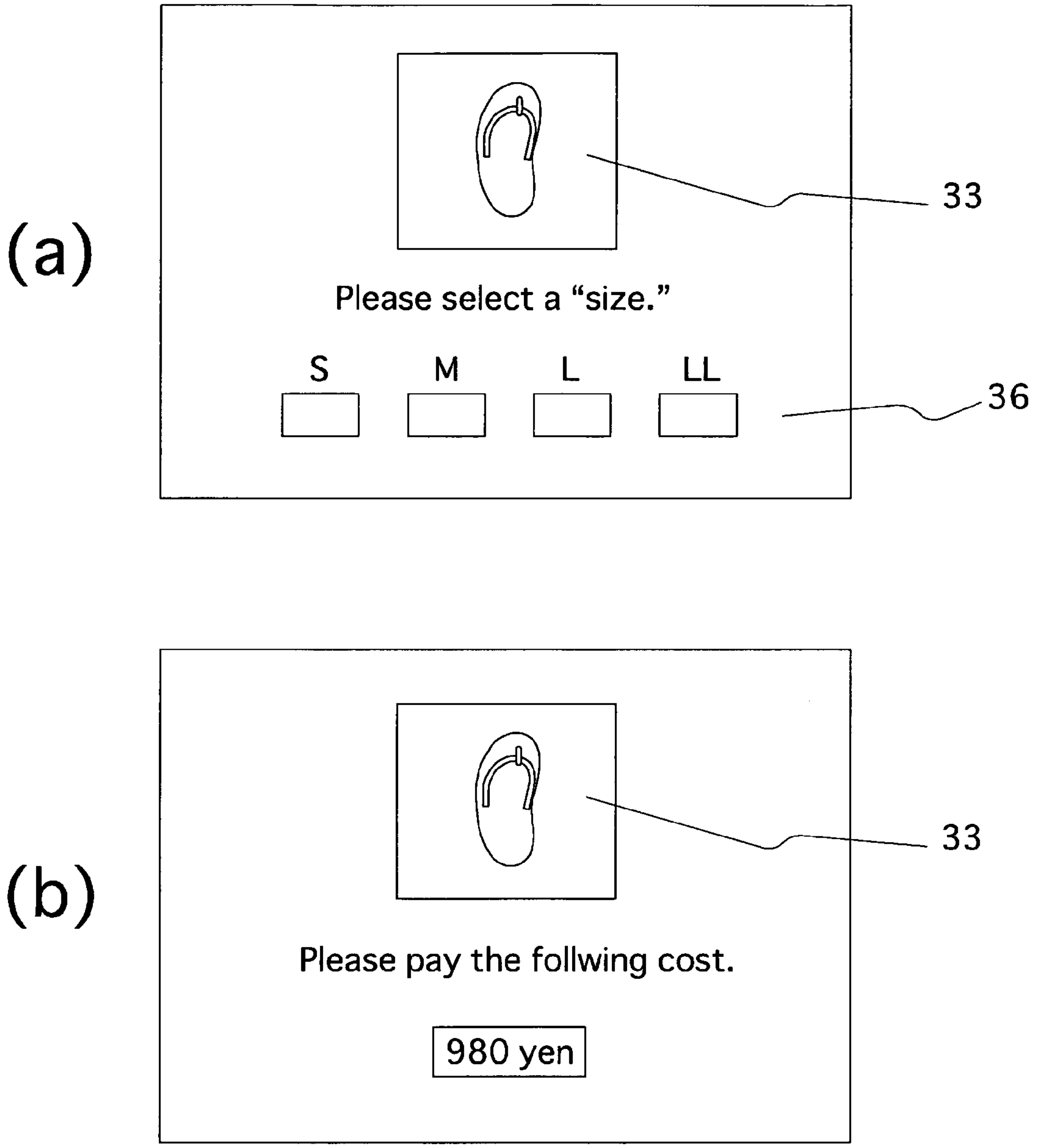
FIG. 4 are explanatory views for explaining operations of Embodiment 1.

When the user has selected and inputted, for example, pink as an upper color in compliance with the screen of FIG. 3(*c*), the control portion 15 makes the liquid crystal display 22 display a "screen prompting the user to select and input a sandal size" as shown in FIG. 4(*a*). In the example of FIG. 4(*a*), as illustrated, a sandal image 33 consisting of a sole and an upper and a total of four select buttons 36 corresponding to a total of four sizes of S, M, L, and LL are displayed. The user operates the cursor keys 24 and select key 25 to select any of the total four sizes. Herein, description will be continued for the following on the assumption that the user has selected, for example, an S-size. Here, in Embodiment 1, in place of the size designations such as S, M, L, and LL, size designations such as "junior," "lady," and "men's" may be used.

When the user has selected and inputted, for example, an S-size in compliance with the screen of FIG. 4(*a*), the control portion 15 calculates a sandal price based on the upper type, sole color, upper color, and size which the user has selected so far and makes the liquid crystal display 22 display a "screen prompting the user to pay the price by coins" as shown in FIG. 4(*b*).

Next, when the user pays bills or coins corresponding to the price displayed on this screen into the compensation paying portion 26 (See FIG. 2), a signal indicating this fact is inputted from the compensation paying portion 26 into the control portion 15. The control portion 15 controls the sole pickup portion 9 and upper pickup portion 11 and makes the same pick up soles of the color and size selected by the user and uppers of the type, color, and size selected by the user out of the sole housing portion 8 and the upper housing portion 9, respectively. As this mechanism for a pickup, although various mechanisms can be utilized, this can be performed by utilizing, for example, a conventional pickup mechanism for commodities utilized in a warehouse or the like.

Next, the control portion 15 controls the attaching mechanism portion 12 so as to attach the picked-up upper (formed of a material such as foam or non-foam of a urethane resin, an EVA resin, a vinyl chloride resin, a TR-based (synthetic rubber) resin or the like to the picked-up sole (formed of a material such as foam or non-foam of a urethane resin, an EVA resin, a vinyl chloride resin, a TR-based (synthetic rubber) resin or the like.)

Figure 5:
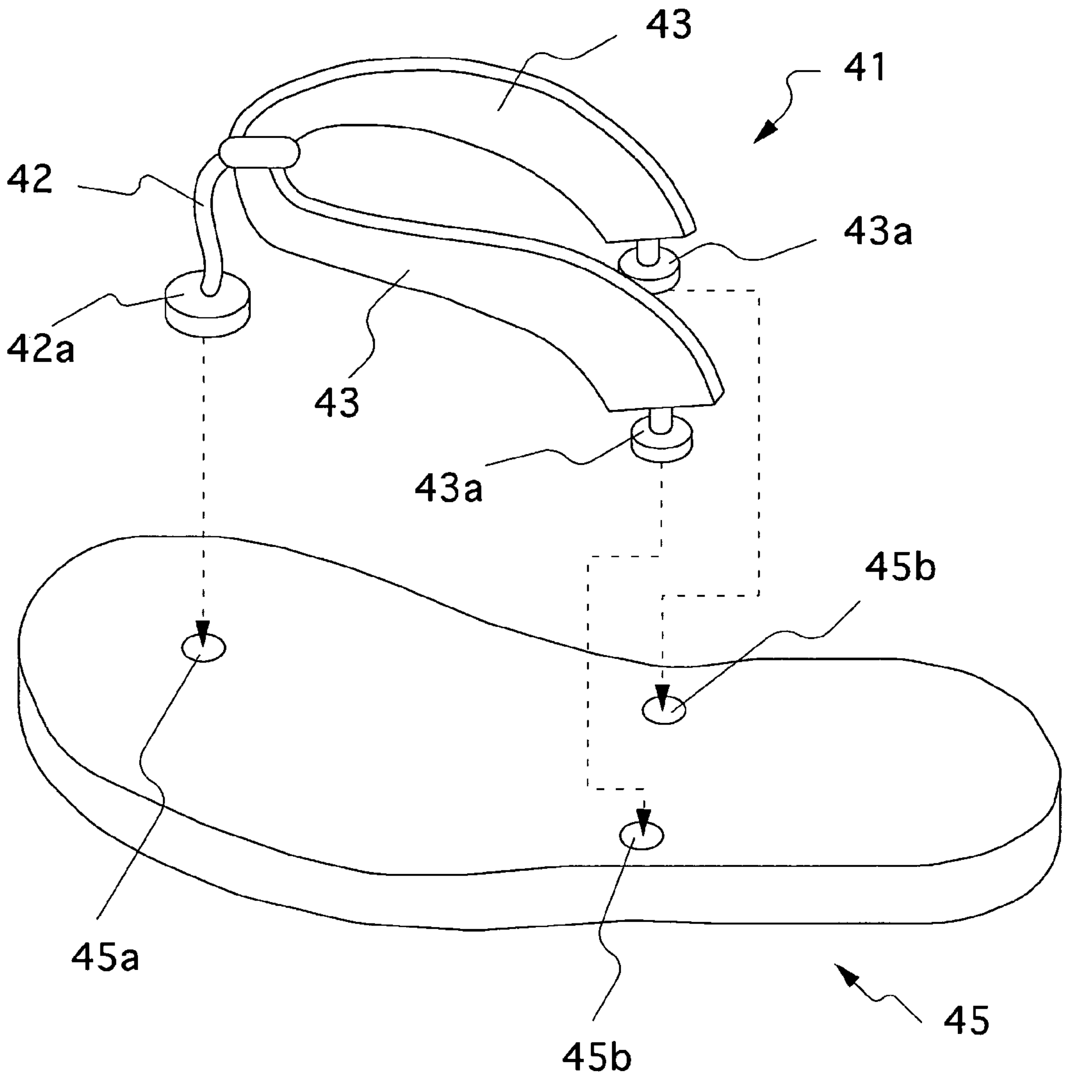
FIG. 5 is an explanatory view for explaining an example of operation of Embodiment 1.

The attaching mechanism portion 12 is for attaching a thong-type upper 41 as shown in FIG. 5 to a sole 45. As shown in FIG. 5, the upper 41 is composed of one axis portion 42 and two wing portions 43. At the lower lend of the axis portion 42, a projecting portion 42*a* for preventing the lower end of the axis portion 42 from coming off after being fitted into a hole 45*a* of the sole 45 is integrally formed. In addition, at the lower ends of the two wing portions 43, respectively, projecting portions 43*a* for preventing the lower ends of the wing portions 43 from coming off after being fitted into holes 45*b* of the sole 45 are integrally formed.

The attaching mechanism portion 12 is constructed so as to attach the upper 41 to the sole 45 by fitting the projecting portion 42*a* at the lower end of the axis portion 42 of the upper 41 and the projecting portions 43*a* at the lower ends of the two wing portions 43 into the hole 45*a* and two holes 45*b* of the sole 45, respectively. Here, although this is not illustrated, on the rear surface of the sole 45, formed is a fitting concavity for preventing the projecting portions 42*a* and 43*a* of the respective lower ends from protruding from the rear surface of the sole 45 when the projecting portions 42*a* and 43*a* of the respective lower ends are fitted inside the respective holes 45*a* and 45*b*.

Figure 6:
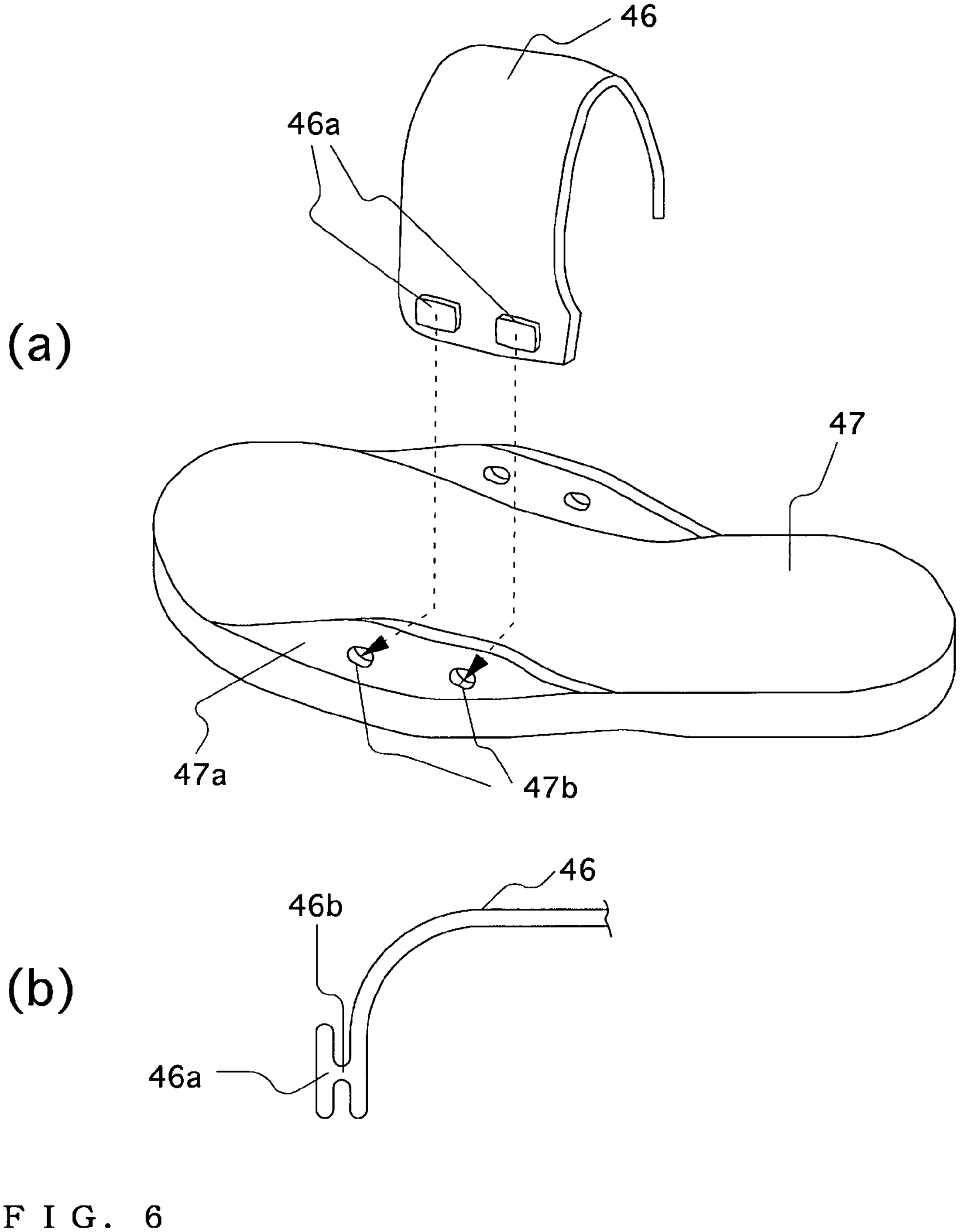
FIG. 6 are explanatory views for explaining another example of operation of Embodiment 1.

Here, as for FIG. 5, although a description has been given for a case where the thong-type upper 41 was attached to the sole 45, in a case where a horizontal belt-type upper (see Reference numeral 31 of FIG. 3(*a*)) is attached to a sole, as well, operations almost identical to those are possible. Namely, in an example of FIG. 6(*a*), two projecting portions 46*a* are formed on both ends of a horizontal belt-type upper 46. These projecting portions 46*a* are, as shown in a side view of FIG. 6(*a*), projecting portions which have been formed on side surfaces of both ends of the upper 46 integrally with the upper 46. In addition, these projecting portions 46*a* are for preventing the upper 46 from coming off after parts shown by Reference numeral 46*b* (FIG. 6(*b*)) of the upper 46 are inserted into holes 47*b* of a sole 47. In this example of FIG. 6(*b*), the upper 46 is attached to the sole 47 by fitting the projecting portions 46*a* and parts shown by Reference numeral 46*b* (FIG. 6(*b*)) of the upper 46 into two holes 47*b* which have been formed in projections 47*a* of both side portions of the sole 47, respectively (see broken lines of FIG. 6(*a*).)

Figure 7:
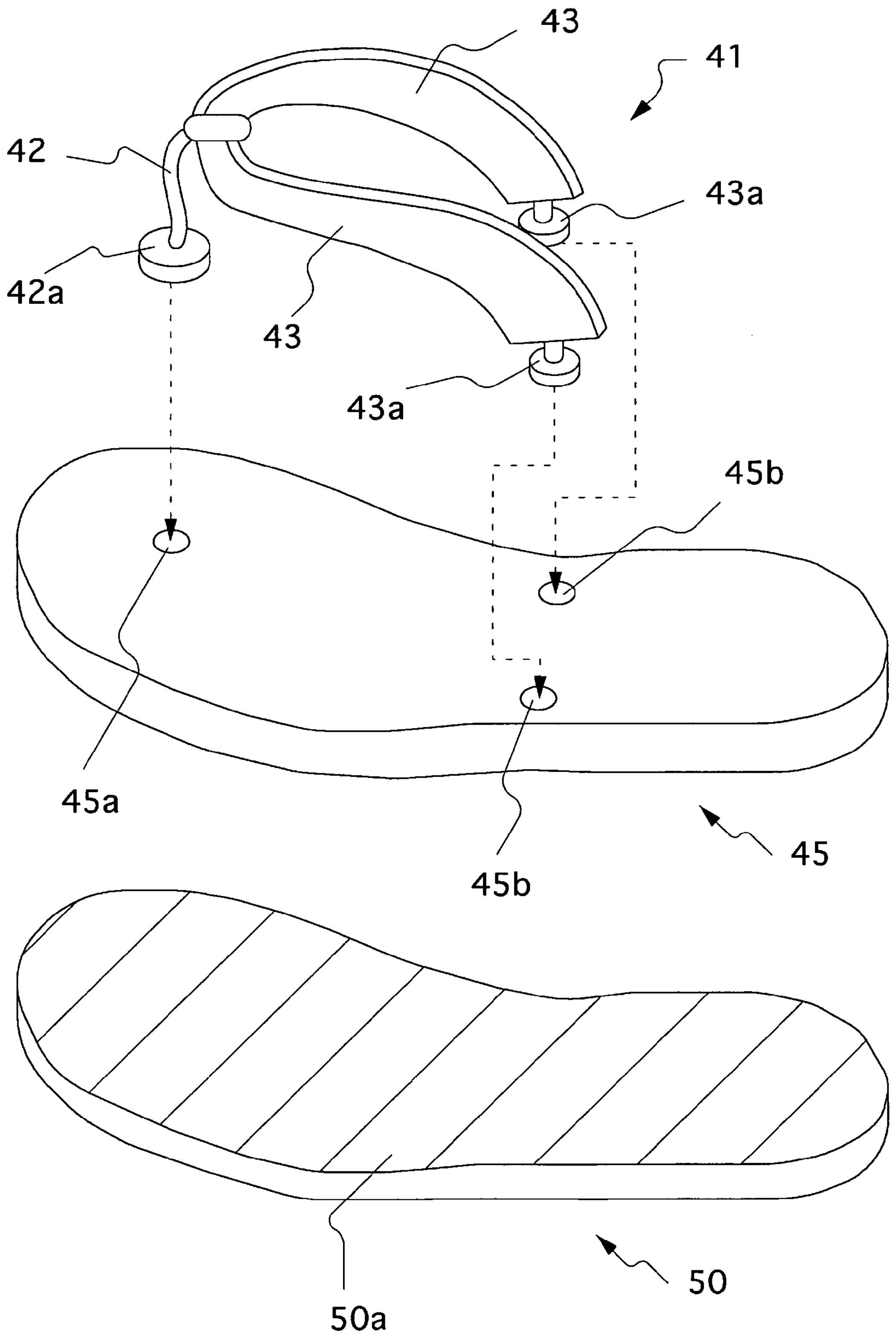
FIG. 7 is an explanatory view for explaining still another example of operation of Embodiment 1.

In addition, in Embodiment 1, it is also possible to provide the attaching mechanism portion 12 with another construction. For example, it may be possible to compose the attaching mechanism portion 12 of a mechanism for fitting respective projecting portions 42*a* and 43*a* of the respective lower ends of a thong-type upper 41 into holes 45*a* and 45*b* of the sole 45 and a mechanism for applying, after this fitting, an adhesive to the rear surface of the sole 43 and an upper surface 50*a* of a shoe sole 50 and joining the same to each other (see FIG. 7.) In this case, the attaching mechanism portion 12, first, fits projecting portions 42*a* and 43*a* of the respective lower end of a thong-type upper 41 into holes 45*a* and 45*b* of a sole 45, then, applies an adhesive to the rear surface of the sole 45 and an upper surface 50*a* of a shoe sole 50, and adheres and joins the same to each other. Then, as a result of solidification of the adhesive after a predetermined time has elapsed in this condition, an attachment of the upper 41 to the sole 45 and shoe sole 50 ends.

Here, in this case, the sole housing portion 8 houses the soles 45 and the shoe soles 50, as "a pair of sole sets," while sorting the same according to sizes and colors. In addition, the sole pickup portion 9 picks up, out of the sole housing portion 8, soles 45 and shoe soles 50 of a size and color selected by a user as "a pair of sole sets."

In addition, in the foregoing case of FIG. 5, since the projecting portions 42*a* and 43*a* of the respective lower ends of the thong-type upper 41 were simply fitted into the respective holes 45*a* and 45*b* of the sole 45, the projecting portions 42*a* and 43*a* of the respective lower ends of the thong-type upper 41 have been exposed from the lower surface of the sole 45. In contrast thereto, in the case of FIG. 7, since the shoe sole 50 is joined to the lower surface of the sole 45 after the projecting portions 42*a* and 43*a* of the respective lower ends of the thong-type upper 41 are fitted into the respective holes 45*a* and 45*b* of the sole 45, an exposure of the projecting portions 42*a* and 43*a* of the respective lower ends of the thong-type upper 41 from the lower surface of the sole 45 is eliminated.

Embodiment 2

Figure 8:
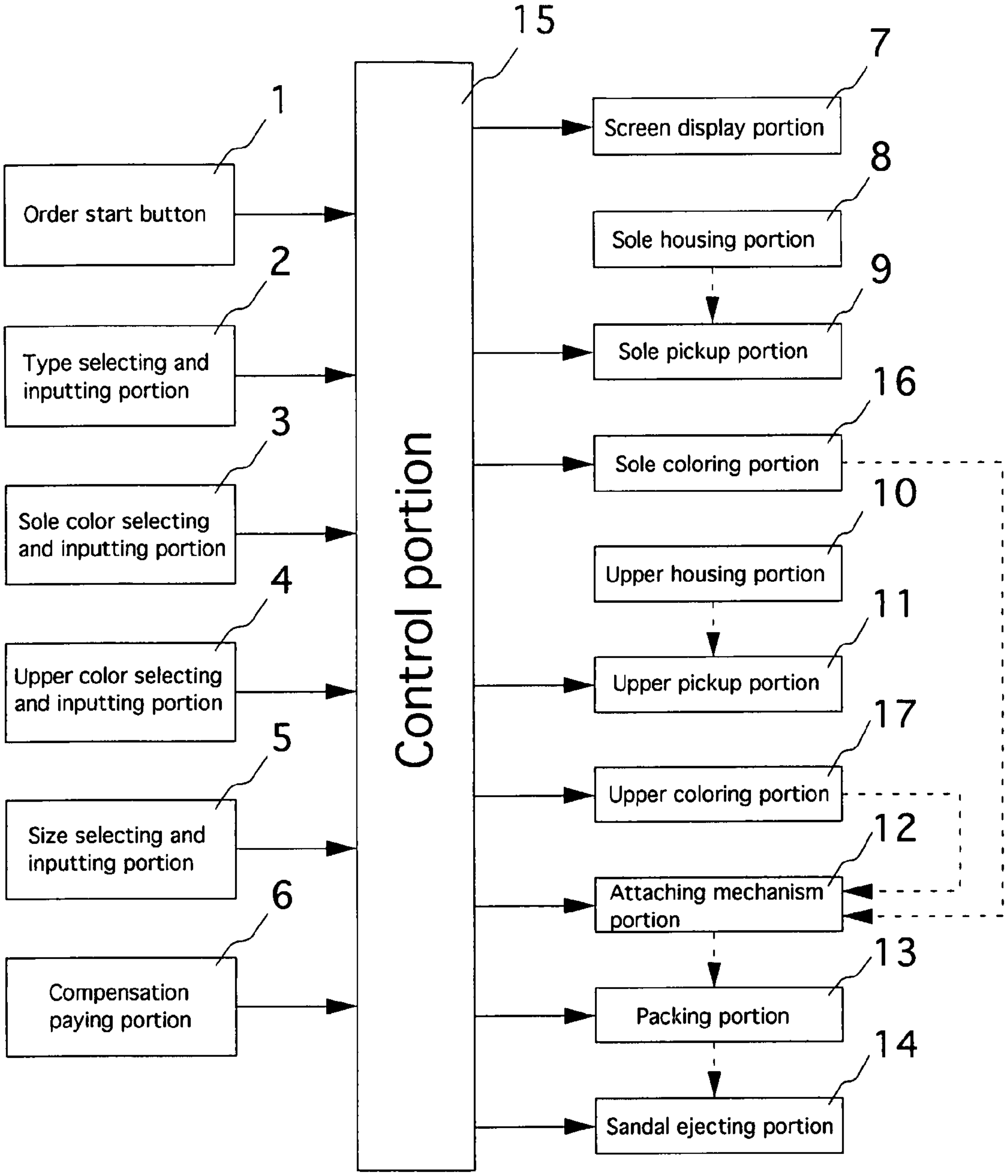
FIG. 8 is a schematic block diagram showing a construction of an automatic manufacturing-vending machine for sandals according to Embodiment 2 of the present invention.

Next, a construction of an automatic manufacturing-vending machine for sandals according to Embodiment 2 of the present invention will be described with reference to FIG. 8. In FIG. 8, identical Reference numerals are used for parts common to those of FIG. 1. In Embodiment 2, a plurality of soles have been merely housed in the sole housing portion 8 according to sizes and have not been sorted according to colors. Namely, the respective soles housed in the sole housing portion 8 have been all maintained with a color of a raw material before being colored as it was (or have been colored white.) In addition, in the upper housing portion 10, as well, a plurality of soles are merely housed according to types and sizes and are not sorted according to colors. Namely, the respective uppers housed in the upper housing portion 10 are all maintained with a color of a raw material before being colored as it was (or have been colored white.)

In addition, in Embodiment 2, the sole pickup portion 9 picks up, out of the sole housing portion 8, soles of a size desired by a user, and then conveys the same toward a sole coloring portion 16 by control of the control portion 15. The sole coloring portion 16 colors, by control of the control portion 15, the soles from the sole pickup portion 9 with a desirable color (see FIG. 3(*b*)) selected by the user. Namely, the sole coloring portion 16 is equipped with a total of ten color paints as shown in FIG. 3(*b*) in advance, and this sprays and applies, based on a signal from the control portion 15, a paint of the color selected by the user to the upper surfaces (or upper surfaces and side surfaces) of the conveyed and arrived soles by a sprayer or the like, and then rotates a fan to dry the paint within a short time.

In addition, in Embodiment 2, the upper pickup portion 10 picks up, out of the upper housing portion 10, uppers of a type and size desired by a user, and then conveys the same toward an upper coloring portion 16 by control of the control portion 15. The upper coloring portion 17 colors, by control of the control portion 15, the uppers from the upper pickup portion 11 with a desirable color (see FIG. 3(*c*)) selected by the user. Namely, the upper coloring portion 17 is provided with a total of ten color paints as shown in FIG. 3(*c*) in advance, and this sprays and applies, based on a signal from the control portion 15, a paint of the color selected by the user to the whole surfaces of the conveyed and arrived uppers by a sprayer or the like, and then rotates a fan (unillustrated) to dry the paint within a short time.

The soles which have been colored by the sole coloring portion 16 and the uppers which have been colored by the upper coloring portion 17 are, by control of the control portion 16, conveyed to the attaching mechanism portion 12, and therein assembled and finished into sandals. Since the construction and operations of Embodiment 2 excluding the above construction and operations are identical to those of Embodiment 2, description thereof is omitted.

Embodiment 3

Figure 9:
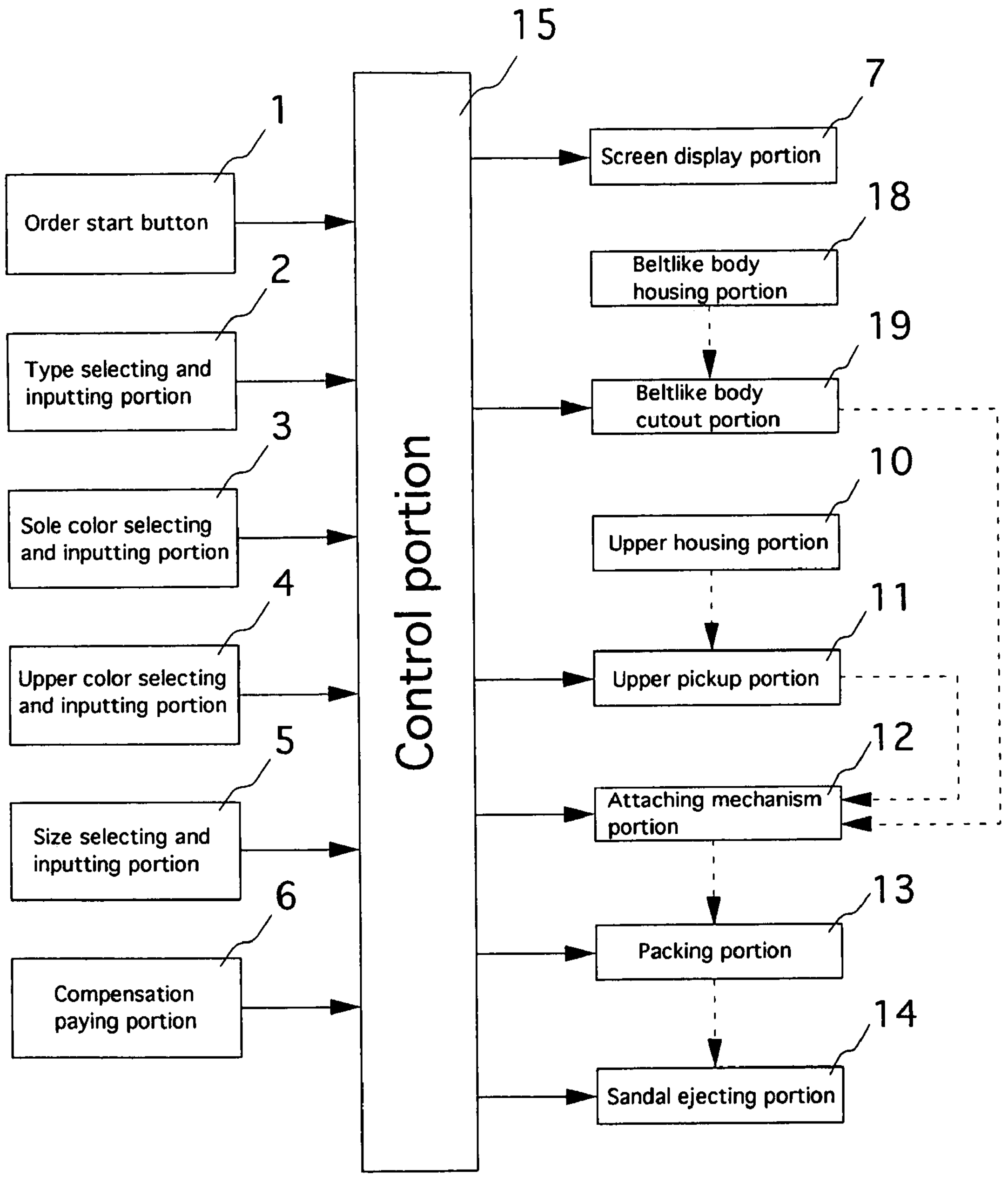
FIG. 9 is a schematic block diagram showing a construction of an automatic manufacturing-vending machine for sandals according to Embodiment 3.

Next, Embodiment 3 of the present invention will be described with reference to FIG. 9. In FIG. 9, identical Reference numerals are used for parts common to those of FIG. 1. In Embodiment 3, a beltlike-body housing portion 18 is equipped in place of the sole housing portion 8 (see FIG. 1) of the aforementioned Embodiment 1. In this beltlike-body housing portion 18, beltlike bodies with predetermined thickness and width dimensions which are made of a raw material for soles (raw material such as a urethane resin or an EVA resin) and which have been rolled in roll forms (see Reference numeral 51 of FIG. 10(*a*)) are respectively housed according to, for example, ten colors.

In addition, in Embodiment 3, a beltlike-body cutout portion 19 (see FIG. 9) is equipped in place of the sole pickup portion 9 (see FIG. 1) of Embodiment 3. This beltlike-body cutout portion 19 draws out, based on a signal from the control portion 15, a front-end part 51*a* of a rolled beltlike body 51 having a color the same as the sole color (see FIG. 3(*b*)) selected by the user, out of the total of ten color-by-color beltlike bodies housed in the beltlike-body housing portion 18, by a predetermined length, and furthermore, selects and uses a cutting die (unillustrated) corresponding to a sole form of the size (see FIG. 4(*a*)) selected by the user to die-cut (cuts out) the drawn-out beltlike body so as to obtain soles 52 in a desirable form. Namely, the beltlike-body cutout portion 19 is provided with a total of four types of cutting dies respectively corresponding to sole forms of a total of four sizes of S, M, L, and LL in advance, and die-cuts (cuts outs), based on a signal from the control portion 15, the front-end part 51*a* of the rolled beltlike body 51 drawn out of the beltlike-body housing portion 18 by a predetermined length by use of a cutting die corresponding to a sole form of the size selected by the user.

Figure 10:
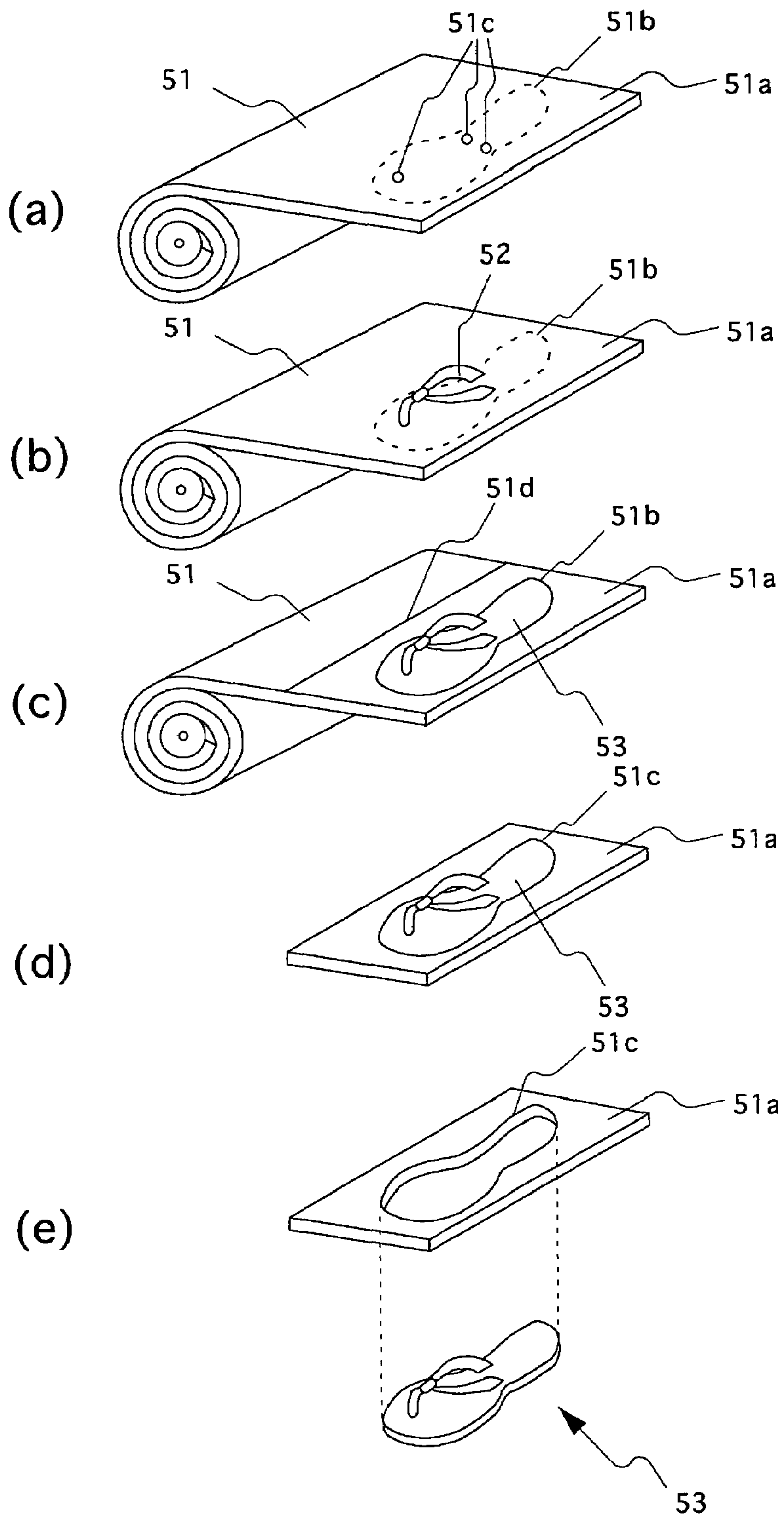
FIG. 10 are explanatory views for explaining operations of Embodiment 3 of the present invention.

Next, an example of sandal manufacturing processes by this beltlike-body cutout portion 19 will be described in detail with reference to FIG. 10. First, as shown in FIG. 10(*a*), a line 51*b* showing a sole form of a size selected by a user is virtually formed (positioned) on the front-end part 51*a* of a beltlike body, and with reference thereto, three holes 51*c* are cut out by a cutting die. Next, as shown in FIG. 10(*b*), into the three holes 51*c*, front-end projecting portions (see Reference numerals 42*a* and 43*a* of FIG. 5) of the axis portion and wing portions of a thong 52 are fitted (inserted). Next, as shown in FIG. 10(*c*), the beltlike body is cut along the virtual line 51*b* showing an external form of the sole by a cutting die (see cut out line 51*c* of FIG. 10(*c*)). Thereby, sandals 53 wherein uppers have been attached to soles are formed.

Furthermore, as shown in FIG. 10(*c*), the front-end part 51*a* is cut at a cutting line 51*d*, whereby only a rectangular part including the sandals 53 is separated from the rolled beltlike body 51. Then, the front-end part 51*a* (including the sandals 53) of the beltlike body cut at the cutting line 51*d* as shown in FIG. 10(*d*) is enclosed in a container such as a plastic bag by the packing portion (see FIG. 9), and this is shifted by the sandal ejecting portion 14 to the sandal discharge port 27 (see FIG. 2.)

The user takes the "front-end part 51*a* of the beltlike-body including the sandals 53" (enclosed in a container such as a bag) out of the sandal ejecting portion 27, and further takes only the part of the sandals 53 out of the front-end port 51*a* to use the same as sandals (the remaining part of the front-end part 51*a* is disposed of.) Since the construction and operations of Embodiment 3 are the same as those of Embodiment 1, description thereof is omitted.

Here, in the respective embodiments in the above, the coin slot 26*a* and bill slot 26*b* have been exemplified as a compensation paying portion 6, however, the present invention is not limited hereto, and for example, the cost for sandals may be paid by making a reader mounted on an automatic manufacturing-vending machine for sandals read out, in contact or out of contact, electronic money information accumulated in an IC card or a personal digital assistant or may be employed, or the cost for sandals may be settled through a user's bank account by use of a personal digital assistant such as a portable telephone and communications lines.

In addition, in the present invention, in place of the "screen prompting the user to select and input a sole color" as shown in FIG. 3(*b*), a "screen prompting the user to select and input an image (character or pattern) which he/she wishes to print on the upper surfaces of soles" (that is, a screen to display a plurality of image (character or pattern) candidates on the liquid crystal display 22 and allows the user to select and input what he/she wishes) may be displayed. And, in the present invention, in place of coloring soles by the sole coloring portion 16 of FIG. 8 (Embodiment 2), the image may be printed by a printer for printing an image (character or pattern) selected and inputted by a user on the "screen prompting the user to select and input an image (character or pattern) which he/she wishes to print on the upper surfaces of soles. In addition, in the present invention, a user may further make the automatic manufacturing-vending machine read in an arbitrary image such as a face image of his/her own or his/her friend and print the read-in image on the upper surfaces of soles by the printer so that the user can manufacture original sandals.

INDUSTRIAL APPLICABILITY

As has been described above, according to an automatic manufacturing-vending machine for sandals according to the present invention, by attaching uppers of a size, type, or color desired by a user to soles of a size or color desired by the user, it becomes possible to provide the user with sandals desired by the user immediately on the spot. Namely, in the present invention, it becomes possible to manufacture and sell a user who needs sandals on a bathing beach or pool sandals of a size, type, or color desired by the user immediately on the spot.

In addition, in the present invention, if soles or uppers are immediately colored with a color desired by a user inside an automatic sandal manufacturing-vending machine upon a payment by the user, since it becomes unnecessary to store soles or uppers according to a plurality of colors in plurality, respectively, the quantity of stock of soles or uppers to be stored inside the automatic sandal manufacturing-vending machine can be reduced, thus it becomes possible to lower the manufacturing and selling cost for sandals.

In addition, in the present invention, if an image (character or pattern) selected by a user or an original image (character or pattern) for which a user has made an automatic sandal manufacturing-vending machine read out is printed on the soles of a size selected by the user, since it becomes unnecessary to store soles according to a plurality of characters or patterns in plurality, respectively, the quantity of stock of soles to be stored inside the automatic sandal manufacturing-vending machine can be reduced, thus it becomes possible to lower the manufacturing and selling cost for sandals. Moreover, in particular, when an original image (a character, a pattern, a photo or the like) for which a user has made an automatic sandal manufacturing-vending machine read out is printed on soles, it becomes possible for the user to manufacture and obtain his/her original sandals.

In addition, in the present invention, if beltlike bodies to be a raw material from which soles are to be cut out have been housed inside an automatic sandal manufacturing-vending machine and soles so that soles immediately cut out from the beltlike body into forms of a size desired by a user inside the automatic sandal manufacturing-vending machine upon a payment by the user, since it becomes unnecessary to store a large number of soles inside the automatic sandal manufacturing-vending machine, the quantity of stock of soles to be stored inside the automatic sandal manufacturing-vending machine can be reduced, thus it becomes possible to lower the manufacturing and selling cost for sandals.

What is claimed is:

1. An automatic manufacturing-vending machine for sandals comprising:

a sole housing portion housing a plurality of soles for sandals according to a plurality of sizes;

a sole pickup portion for picking up soles of a predetermined size out of the plurality of soles housed in the sole housing portion;

an upper housing portion housing a plurality of uppers for sandals according to a plurality of sizes;

an upper pickup portion for picking up uppers of a predetermined size out of the plurality of uppers housed in the upper housing portion;

a size selecting portion for a user to select a desirable size of soles and uppers;

a compensation paying portion for a user to pay compensation for manufacturing and vending desirable sandals;

a control means for controlling the sole pickup portion and the upper pickup portion so as to pick up soles and uppers of a size selected by a user out of the sole housing portion and the upper housing portion, respectively, based on a signal from the size selecting portion or the compensation inputting portion;

an attaching mechanism portion for attaching the picked-up uppers to the picked-up soles based on a signal from the control means of the compensation paying portion; and a sandal ejecting portion for ejecting sandals formed by attaching the uppers to the soles by the attaching mechanism portion into a sandal takeout opening from which a user can take out the same, wherein the sole housing portion, the upper housing portion, the sole pickup portion, the upper pickup portion, the attaching mechanism portion, and the sandal ejecting portion are housed in one housing.

2. An automatic manufacturing-vending machine for sandals comprising:

a sole housing portion housing a plurality of soles for sandals according to a plurality of sizes;

a sole pickup portion for picking up soles of a predetermined size out of the plurality of soles housed in the sole housing portion;

an upper housing portion housing a plurality of uppers for sandals according to a plurality of sizes and a plurality of types;

an upper pickup portion for picking up uppers of a predetermined size and type out of the plurality of uppers housed in the upper housing portion;

a size and type selecting portion for a user to select a desirable size and type of soles and uppers;

a compensation paying portion for a user to pay compensation for manufacturing and vending desirable sandals;

a control means for controlling the sole pickup portion and the upper pickup portion so as to pick up soles of a size selected by a user out of the sole housing portion and pick up uppers of a size and type selected by a user from the upper housing portion based on a signal from the size and type selecting portion or the compensation inputting portion;

an attaching mechanism portion for attaching the picked-up uppers to the picked-up soles based on a signal from the control means of the compensation paying portion; and a sandal ejecting portion for ejecting sandals formed by attaching the uppers to the soles by the attaching mechanism portion into a sandal takeout opening from which a user can take out the same, wherein the sole housing portion, the upper housing portion, the sole pickup portion, the upper pickup portion, the attaching mechanism portion, and the sandal ejecting portion are housed in one housing.

3. An automatic manufacturing-vending machine for sandals comprising:

a sole housing portion housing a plurality of soles for sandals according to a plurality of sizes and a plurality of colors;

a sole pickup portion for picking up soles of a predetermined size and color out of the plurality of soles housed in the sole housing portion;

an upper housing portion housing a plurality of uppers for sandals according to a plurality of sizes and a plurality of colors;

an upper pickup portion for picking up upper portions of a predetermined size and color out of the plurality of uppers housed in the upper housing portion;

a size and color selecting portion for a user to select a desirable size and color of soles and uppers;

a compensation paying portion for a user to pay compensation for manufacturing and vending desirable sandals;

a control means for controlling the sole pickup portion and the upper pickup portion so as to pick up soles and uppers of a size and color selected by a user out of the sole housing portion and the upper housing portion, respectively, based on a signal from the size and color selecting portion or the compensation inputting portion;

an attaching mechanism portion for attaching the picked-up uppers to the picked-up soles based on a signal from the control means of the compensation paying portion; and a sandal ejecting portion for ejecting sandals formed by attaching the uppers to the soles by the attaching mechanism portion into a sandal takeout opening from which a user can take out the same, wherein the sole housing portion, the upper housing portion, the sole pickup portion, the upper pickup portion, the attaching mechanism portion, and the sandal ejecting portion are housed in one housing.

4. An automatic manufacturing-vending machine for sandals comprising:

a beltlike-body housing portion housing beltlike bodies for forming soles for sandals of a plurality of sizes;

an upper housing portion housing a plurality of uppers for sandals according to a plurality of sizes;

an upper pickup portion for picking up uppers of a predetermined size out of the plurality of uppers housed in the upper housing portion;

a sole size selecting portion for a user to select a desirable size of soles;

an upper size selecting portion for a user to select a desirable size of uppers;

a compensation paying portion for a user to pay compensation for manufacturing and vending desirable sandals;

a cutout portion for cutting out a beltlike body from the beltlike-body housing portion into forms of the size of soles selected by a user;

a control means for controlling the upper pickup portion so as to pick up uppers of a size selected by a user out of the upper housing portion based on a signal from the upper size selecting portion or the compensation inputting portion;

an attaching mechanism portion for attaching uppers picked up out of the upper housing portion to soles cut out by the cutout portion based on a signal from the cutout portion, the control portion, or the compensation paying portion; and a sandal ejecting portion for ejecting sandals formed by attaching the uppers to the soles by the attaching mechanism portion into a sandal takeout opening from which a user can take out the same, wherein the beltlike-body housing portion, the upper housing portion, the upper pickup portion, the cutout portion, the attaching mechanism portion, and the sandal ejecting portion are housed in one housing.

5. An automatic manufacturing-vending machine for sandals comprising:

a beltlike-body housing portion housing beltlike bodies for forming soles for sandals of a plurality of sizes and types;

an upper housing portion housing a plurality of uppers for sandals according to a plurality of sizes and a plurality of types;

an upper pickup portion for picking up uppers of a predetermined size and type out of the plurality of uppers housed in the upper housing portion;

a size and type selecting portion for a user to select a desirable size of soles and a desirable size and type of uppers;

a compensation paying portion for a user to pay compensation for manufacturing and vending desirable sandals;

a cutout portion for cutting out a beltlike body from the beltlike-body housing portion into forms of the size of soles selected by a user based on a signal from the size and type selecting portion or the compensation inputting portion;

a control means for controlling the upper pickup portion so as to pick up uppers of a size and type selected by a user out of the upper housing portion based on a signal from the size and type selecting portion or the compensation inputting portion;

an attaching mechanism portion for attaching uppers picked up out of the upper housing portion to soles cut out by the cutout portion based on a signal from the cutout portion, the control portion, or the compensation paying portion; and a sandal ejecting portion for ejecting sandals formed by attaching the uppers to the soles by the attaching mechanism portion into a sandal takeout opening from which a user can take out the same, wherein the beltlike-body housing portion, the upper housing portion, the upper pickup portion, the cutout portion, the attaching mechanism portion, and the sandal ejecting portion are housed in one housing.

6. The automatic manufacturing-vending machine for sandals according to claim 1 or 2, further provided with:

a sole color selecting portion for a user to select a desirable sole color;

an upper color selecting portion for a user to select a desirable upper color;

a sole coloring portion for coloring, based on a signal from the sole color selecting portion, soles selectively picked out of the sole housing portion with a color selected by a user; and an upper coloring portion for coloring, based on a signal from the upper color selecting portion, uppers selectively picked out of the upper housing portion with a color selected by a user.

7. The automatic manufacturing-vending machine for sandals according to claim 1, 2, or 3 further provided with:

a sole image forming portion for a user to select or externally import a desirable print image of soles; and a sole printing portion for printing an image selected by a user on soles selectively picked out of the sole housing portion based on a signal from the sole image forming portion.

8. The automatic manufacturing-vending machine for sandals according to claim 4 or 5 further provided with:

a sole color selecting portion for a user to select a desirable sole color;

an upper color selecting portion for a user to select a desirable upper color;

a sole coloring portion for coloring, based on a signal from the sole color selecting portion, soles selectively picked out of the sole housing portion or soles obtained by being cut out from the beltlike-body by the cutout portion with a color selected by a user; and an upper coloring portion for coloring, based on a signal from the upper color selecting portion, uppers selectively picked out of the upper housing portion with a color selected by a user.

9. The automatic manufacturing-vending machine for sandals according to any of claims 1 to 5 further provided with:

in the housing, a display portion for displaying images to serve a user in selecting a sole color, an upper color, or an upper type.

* * * * *